(12) United States Patent
Kim et al.

(10) Patent No.: US 9,014,371 B2
(45) Date of Patent: Apr. 21, 2015

(54) ENCRYPTION DEVICE AND METHOD FOR DEFENDING A PHYSICAL ATTACK

(75) Inventors: Dong Kyue Kim, Seoul (KR); Byong Deok Choi, Seoul (KR)

(73) Assignee: ICTK Co., Ltd, Seoul (KR)

( * ) Notice: Subject to any disclaimer, the term of this patent is extended or adjusted under 35 U.S.C. 154(b) by 0 days.

(21) Appl. No.: 13/985,765

(22) PCT Filed: Feb. 28, 2011

(86) PCT No.: PCT/KR2011/001376
§ 371 (c)(1),
(2), (4) Date: Aug. 15, 2013

(87) PCT Pub. No.: WO2012/111872
PCT Pub. Date: Aug. 23, 2012

(65) Prior Publication Data
US 2013/0322624 A1 Dec. 5, 2013

(30) Foreign Application Priority Data
Feb. 15, 2011 (KR) .................. 10-2011-0013269

(51) Int. Cl.
*H04L 29/06* (2006.01)
*H04L 9/28* (2006.01)
*H04L 9/00* (2006.01)

(52) U.S. Cl.
CPC *H04L 9/28* (2013.01); *H04L 9/002* (2013.01); *H04L 2209/12* (2013.01)

(58) Field of Classification Search
CPC ............ H04L 9/0861; H04L 9/14; H04L 9/08

USPC ........................................... 380/44
See application file for complete search history.

(56) References Cited

U.S. PATENT DOCUMENTS

| | | | |
|---|---|---|---|
| 7,991,154 B2 * | 8/2011 | Longa et al. | 380/30 |
| 8,036,379 B2 * | 10/2011 | Ferguson et al. | 380/29 |
| 8,051,097 B2 * | 11/2011 | Betouin et al. | 707/781 |

(Continued)

FOREIGN PATENT DOCUMENTS

| | | | |
|---|---|---|---|
| EP | 2650813 A1 | 10/2013 | |
| JP | 08-278750 A | 10/1996 | |

(Continued)

OTHER PUBLICATIONS

European Search Report dated Jul. 8, 2014, in European Application No. 11858891.2-1870.

(Continued)

*Primary Examiner* — Michael S McNally
(74) *Attorney, Agent, or Firm* — Finnegan, Henderson, Farabow, Garrett & Dunner, LLP

(57) ABSTRACT

Provided are a security device and a method for operating same. The security device may conceal an encryption key used for an encryption algorithm in an encryption module in correspondence to security attacks such as reading information on where the encryption key is stored in a memory by disassembling an IC chip, or extracting said information through microprobing. The encryption key may be included as a physical encryption key module in an encryption module, and a certain storage medium for storing the encryption key may be included in the encryption module. Accordingly, the encryption key is not transmitted via a bus in a security device for encryption.

16 Claims, 13 Drawing Sheets

(56) References Cited

U.S. PATENT DOCUMENTS

| | | | |
|---|---|---|---|
| 8,345,865 B2 * | 1/2013 | Lee et al. | 380/37 |
| 8,509,428 B2 * | 8/2013 | Lee et al. | 380/44 |
| 2008/0044010 A1 * | 2/2008 | Vasyltasov | 380/28 |
| 2008/0285745 A1 * | 11/2008 | Teglia et al. | 380/29 |
| 2009/0080647 A1 | 3/2009 | Mantin et al. | |

FOREIGN PATENT DOCUMENTS

| | | |
|---|---|---|
| JP | 10-116326 A | 5/1998 |
| JP | 2000-122931 | 4/2000 |
| JP | 2004-511082 | 4/2004 |
| JP | 2006-173485 | 6/2006 |
| JP | 2009-524998 | 7/2009 |
| JP | 2011-010218 | 1/2011 |
| KR | 10-2006-0051957 A | 5/2006 |
| WO | WO 01/73841 A3 | 10/2001 |
| WO | WO 2007/087559 A3 | 8/2007 |
| WO | WO 2008/056612 | 5/2008 |
| WO | WO 2009/024913 A2 | 2/2009 |
| WO | WO 2010/055171 A1 | 5/2010 |

OTHER PUBLICATIONS

International Search Report, mailed Feb. 17, 2012, in International Application No. PCT/KR2011/001376.

B. Choi et al., Integrated circuit design for physical unclonable function using differential amplifiers, Analog Integrated Circuits and Signal Processing, vol. 66, Issue 3, pp. 467-474, 2011 (8 pages).

* cited by examiner

1200

ENCRYPTION DEVICE AND METHOD FOR DEFENDING A PHYSICAL ATTACK

FIELD OF INVENTION

The present invention relates to digital security, and more particularly, to an encryption device and method for managing an encryption key to defend against physical attacks in an integrated circuit (IC) security module, for example, a smart card, and the like.

DESCRIPTION OF THE RELATED ART

A smart card refers to a credit card sized plastic card, and may include an integrated circuit (IC) to process data. Such a smart card has various advantages, when compared to a conventional magnetic card, in that the smart card has an internal data storage capacity, and includes a processing unit, for example, a coprocessor, a microprocessor, and the like.

Accordingly, the smart card may perform an encryption operation autonomously using an encryption algorithm, in order to handle financial payment information, personal information for identification, and the like.

In the meantime, with a development of various information technologies, smart cards are widely used, and various security threats against smart cards are increasing.

For example, physical attacks of reading information in an IC chip using reverse engineering technologies relating to IC chips may be a big issue in terms of security.

A number of known physical attacks may employ attack schemes, for example, bus probing, test-mode probing, overwriting with respect to a read-only memory (ROM) or an electrically erasable and programmable read only memory (EEPROM), and the like, depending on a data storage scheme and a memory characteristic of a ROM and an EEPROM used in a hardware security module.

SUMMARY

An aspect of the present invention provides an encryption device and method robust against physical attacks on a smart card.

In particular, another aspect of the present invention provides an encryption device and method that may prevent a generated or stored encryption key from being extracted directly from a memory. In addition, still another aspect of the present invention provides an encryption device and method that may prevent leakage through a bus in an integrated circuit (IC) chip of a smart card.

According to an aspect of the present invention, there is provided an encryption device for executing an encryption algorithm using an encryption key as receiving an input data to be encrypted, the encryption device including an encryption module, including an encryption key module to provide an encryption key, to execute the encryption algorithm using the encryption key provided by the encryption key module.

The encryption module may include a plurality of encryption key modules to provide different encryption keys. In this example, the encryption module may include an encryption key module selector to select one of the plurality of encryption key modules, and an encryption unit to execute the encryption algorithm using an encryption key provided by the selected encryption key module.

The encryption key module selector may select an encryption key module corresponding to a pre-assigned identification index from among the plurality of encryption key modules.

The encryption module may include a plurality of standard cells, and the plurality of encryption key modules may be disposed at random positions among layouts of the plurality of standard cells included in the encryption module. The standard cells may include standardized device or device blocks to be used for implementation of the encryption module.

The encryption module may execute the encryption algorithm using the encryption key provided by the encryption key module included in the encryption module, and the encryption key provided by the encryption key module may not leak out of the encryption module, and an additional encryption key for executing the encryption algorithm may not flow in the encryption module.

The encryption key module may include a non-volatile memory module to store a pre-generated encryption key.

The encryption key module may include a non-memory module to generate and provide the encryption key.

In this instance, whether nodes in the encryption key module are shorted may be probabilistically determined by violating a design rule provided in a semiconductor manufacturing process, and the encryption key module may generate and provide the encryption key based on a result of reading whether the nodes are shorted.

Here, the nodes in the encryption key module may be conductive layers of a semiconductor, the design rule may be associated with a size of a via or a contact formed between the conductive layers of the semiconductor, and the encryption key module may generate and provide the encryption key based on whether the via or the contact shorts the conductive layers.

The via or the contact may have a size by which a difference between a probability that the via or the contact shorts the conductive layers and a probability that the via or the contact does not short the conductive layers is within a predetermined error range by violating the design rule.

The encryption key module may include N unit structures, each one of which generates a 1-bit digital value using a single pair of conductive layers and a single via or a contact connecting the conductive layers, and generate an N-bit digital value generated through the N unit structures as the encryption key. Here, N denotes a natural number.

In this instance, the encryption key module may generate an N/k-bit digital value as the encryption key, by dividing the generated N-bit digital value into k units, comparing a first group to a second group, among the plurality of groups, determining digital values representing the first group and the second group to be "1" when a value including k digital bits included in the first group is greater than a value including k digital bits included in the second group, and determining the digital values representing the first group and the second group to be "0" when the value including k digital bits included in the first group is less than or equal to the value including k digital bits included in the second group. Here, k denotes a natural number.

The nodes in the encryption key module may be conductive layers of a semiconductor, and the design rule may be associated with a gap between the conductive layers of the semiconductor, and the encryption key module may generate and provide the encryption key based on whether the conductive layers of the semiconductor are shorted.

The encryption key module may include N unit cells, each to output a 1-bit digital value, each of the N unit cells may generate the 1-bit digital value based on a semiconductor manufacturing process variation, and the encryption key module may generate and provide an encryption key of N bits. Here, N denotes a natural number.

In this instance, a first unit cell among the N unit cells may include a first inverter having a first logic threshold, and a second inverter having a second logic threshold. The first inverter and the second inverter may form a feedback structure in which an input terminal of the first inverter and an output terminal of the second inverter are connected to a first node, and an output terminal of the first inverter and an input terminal of the second inverter are connected to a second node. The first logic threshold may be different from the second logic threshold based on the semiconductor manufacturing process variation, and a 1-bit digital value corresponding to the first unit cell may be determined based on a logical level of the first node and a logical level of the second node.

The encryption key module may include N differential amplifiers. When two input terminals of a first differential amplifier, among the N differential amplifiers, are shorted, logical levels of two output terminals of the first differential amplifier may differ from each other based on the semiconductor manufacturing process variation, and a 1-bit digital value corresponding to the first differential amplifier may be determined based on the logical levels of the two output terminals, and the encryption key module may generate and provide an encryption key of N bits. Here, N denotes a natural number.

According to another aspect of the present invention, there is also provided an encryption method including receiving an input data to be encrypted into an encryption module, including an encryption key module to provide an encryption key, and encrypting the data by executing an encryption algorithm using the encryption key provided by the encryption key module.

According to still another aspect of the present invention, there is also provided an integrated circuit (IC) chip for executing an encryption algorithm using an encryption key by receiving data to be encrypted, the IC chip including an encryption module, including an encryption key module to provide an encryption key, to execute the encryption algorithm using the encryption key provided by the encryption key module.

In this instance, the IC chip may be disposed in a smart card to execute the encryption algorithm in applications of the smart card.

Effect of the Invention

An aspect of the present invention provides a device and method that may be safe from a physical attack, for example, bus probing, or an attack on a non-volatile memory, since a key may not be generated outside of an encryption module, and not be stored in a memory or transmitted through a bus, and the like.

Another aspect of the present invention provides a device and method that may be safe from a physical attack of extracting contents in a memory, since encryption key modules may be disposed to be scattered at random in a module, similar to other standard cells, and thus, the encryption key modules may be difficult to find directly.

Still another aspect of the present invention provides a device and method that may achieve improvements in terms of a space and an amount of power to be used, since a separate non-volatile memory to store an encryption key may be unnecessary.

DETAILED DESCRIPTION

Figure 1:
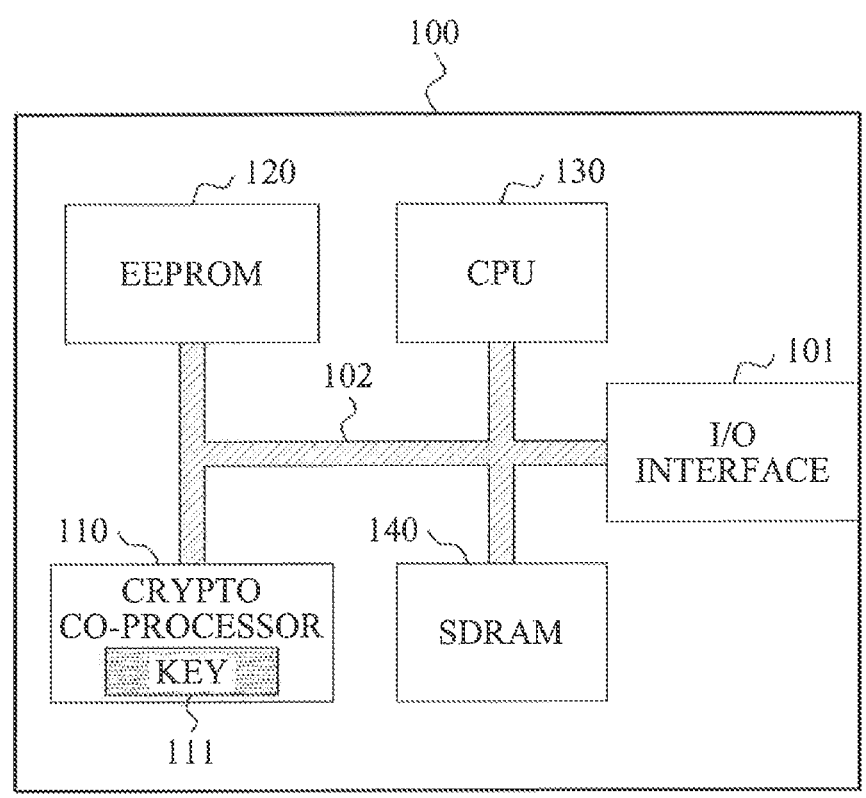
FIG. 1 illustrates an encryption device according to an embodiment of the present invention.

Reference will now be made in detail to embodiments of the present invention, examples of which are illustrated in the accompanying drawings. However, the present invention is not limited to the described embodiments. In the drawings, like reference numerals refer to the like elements throughout.

FIG. 1 illustrates an encryption device 100 according to an embodiment of the present invention.

As an example, the encryption device 100 may be included in an integrated circuit (IC) chip of a smart card. The encryption device 100 may include an electrically erasable and programmable read only memory (EEPROM) 120 to store data, a central processing unit (CPU) 130, and optionally, a synchronous dynamic random access memory (SDRAM) 140. The encryption device 100 may communicate with an external environment through an input/output (I/O) interface 101.

The encryption device 100 may include an encryption module 110, for example, a crypto co-processor for encryption.

Hereinafter, unless otherwise mentioned, depending on an application of the encryption device 100 included in a smart card or an IC chip of a smart card, at least a portion of the optional SDRAM 140, the CPU 130, and the EEPROM 120 may be omitted, and various changes and applications may be made within the scope of the embodiments herein without departing from the spirit of the present invention.

In addition, hereinafter, unless otherwise mentioned, the I/O interface 101 may be an input and output route of data input into, or output from, the encryption device 100, irrespective of schemes, for example, a contact type scheme and/or a contactless scheme.

The encryption module 110 of the encryption device 100 may use an encryption key in a process of executing an encryption algorithm. The encryption key may include a public key, a secret key, and the like.

In a conventional scheme, an encryption key for executing an encryption algorithm may be stored outside of the encryption module 110 in a form of a digital value, and the encryption module 110 may receive the encryption key through a bus 102 in a process of encrypting and/or decrypting data by executing the encryption algorithm.

However, such a scheme is vulnerable to physical attacks of figuring out an encryption key and/or an encryption algorithm.

Such physical attacks may directly attack a region in a memory, for example, the EEPROM 120, and the like, in which an encryption key is present, to extract the encryption key in the memory using a method, for example, probing, or memory scanning. In addition, a location of the bus 102 in the IC chip may be verified by performing reverse engineering. Accordingly, the encryption key may be extracted by performing bus probing using a micro-probe when a predetermined command is performed artificially.

According to the present embodiment, an encryption key may be generated directly by an encryption key module 111 included in the encryption module 110, and/or a pre-generated encryption key may be stored in the encryption key module 111. Such an encryption key may be provided when the encryption module 110 executes an encryption algorithm.

Accordingly, the encryption key to be used by the encryption module 110 in the process of executing the encryption algorithm may not be stored outside of the encryption module 110 in a form of a digital value, and may not be transferred through the bus 102 and thus, physical attacks on the encryption algorithm of the encryption module 110 may be prevented.

The encryption key module 111 to generate and/or store an encryption key and provide the encryption key when an encryption algorithm is executed by the encryption module 110 may be physically included or embedded in the encryption module 110. Various exemplary embodiments of a configuration and an operation of the encryption module 110 will be described with reference to FIG. 2 and the subsequent drawings.

Figure 2:
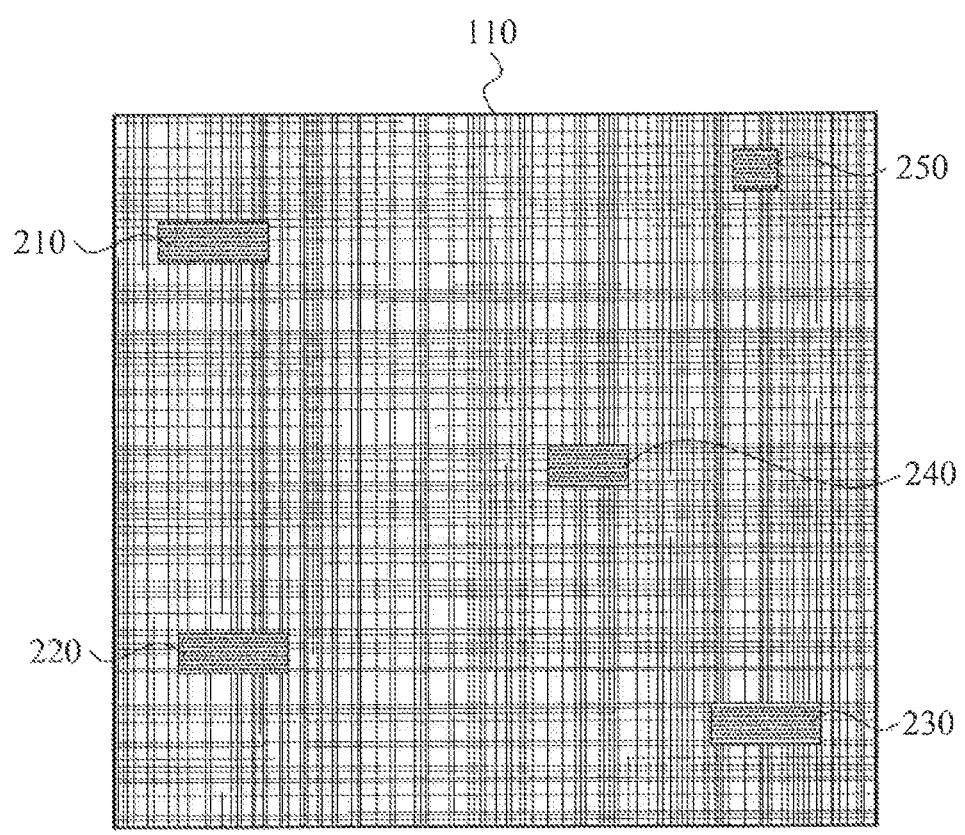
FIG. 2 illustrates an encryption module according to an embodiment of the present invention.

FIG. 2 illustrates the encryption module 110 according to an embodiment of the present invention.

As shown in FIG. 1, the encryption module 110 may be connected to other components through the bus 102 in the encryption device 100.

Referring to FIG. 2, the encryption module 110 may include at least one encryption key module 210, 220, 230, 240, and 250.

The encryption key modules 210, 220, 230, 240, and 250 may generate and/or store encryption keys to be used for executing an encryption algorithm, individually or jointly, and provide the encryption keys to the encryption module 110.

In an embodiment, a single encryption key module may be included in the encryption module 110. In another embodiment, a plurality of encryption key modules may be included in the encryption module 110, as shown in FIG. 2.

In addition, when a plurality of encryption key modules is included in the encryption module 110, at least a portion of the plurality of encryption key modules 210, 220, 230, 240, and 250 may correspond to dummies that do not provide encryption keys.

An embodiment in which the encryption key modules 210, 220, 230, 240, and 250 are implemented may include a case in which the encryption key modules 210, 220, 230, 240, and 250 correspond to memory devices, and a case in which the encryption key modules 210, 220, 230, 240, and 250 correspond to non-memory devices.

An embodiment in which a portion of the encryption key modules 210, 220, 230, 240, and 250 correspond to memory devices, and another portion of the encryption key modules 210, 220, 230, 240, and 250 correspond to non-memory devices may also be possible. The present invention should not be construed as being limited to a portion of the embodiments.

As an example, in the embodiment in which the encryption key modules 210, 220, 230, 240, and 250 include memory devices, pre-generated encryption keys of a form of a digital value may be simply stored in the encryption key modules 210, 220, 230, 240, and 250 corresponding to the memory devices, and may be read for use, as necessary, in a process of executing an encryption algorithm by the encryption module 110.

In the other embodiment, when the encryption key modules 210, 220, 230, 240, and 250 include non-memory devices, at least a portion of the encryption key modules 210, 220, 230, 240, and 250 may be implemented by physical unclonable functions (PUFs).

In the embodiment in which the encryption key modules 210, 220, 230, 240, and 250 include non-memory devices such as PUFs, there are various embodiments for implementing the PUFs. As an example, the PUFs may be implemented by violating a design rule in a semiconductor manufacturing process, or using a semiconductor manufacturing process variation.

Such embodiments will be described in detail with reference to FIGS. 4 through 13.

Figure 3:
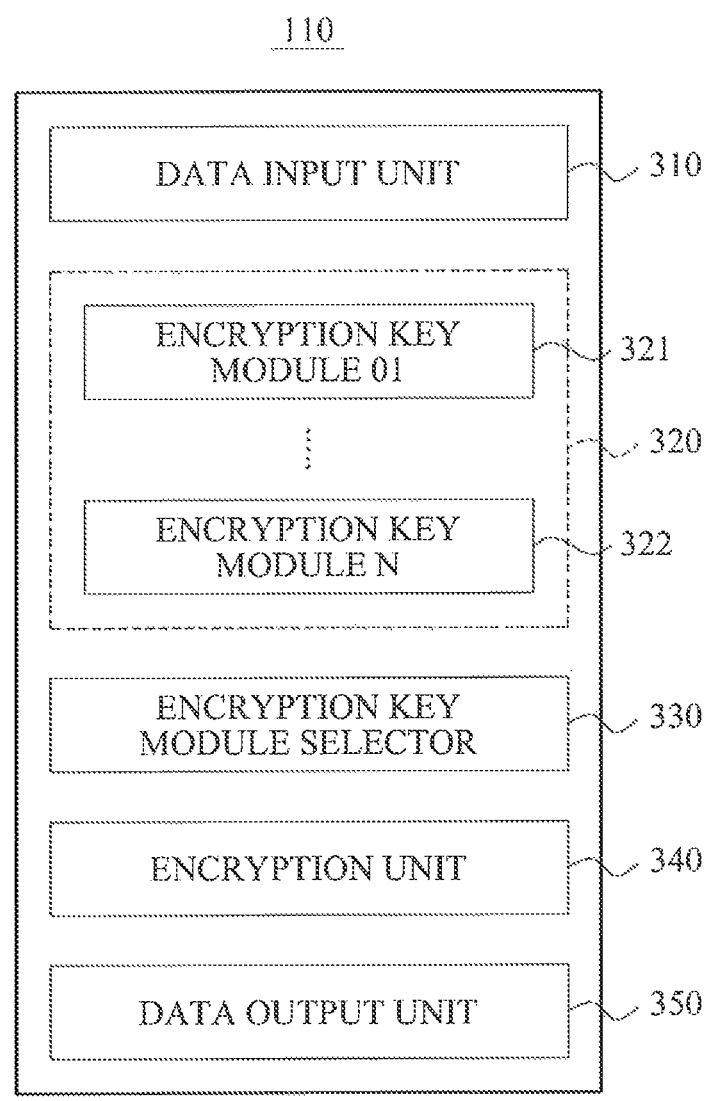
FIG. 3 is a block diagram illustrating an exemplary configuration of an encryption module according to an embodiment of the present invention.

FIG. 3 is a block diagram illustrating an exemplary configuration of the encryption module 110 according to an embodiment of the present invention.

When data to be encrypted is input into a data input unit 310 through the bus 102, and the like, execution of an encryption algorithm may be initiated.

As described with reference to FIG. 2, a single encryption key module 320 or a plurality of encryption key modules 320 may be physically included in the encryption module 110.

As an example, when an encryption key module 01 (321) through an encryption key module N (322) are present, an encryption key module selector 330 may select an encryption key module to provide an encryption key to be used for an encryption algorithm. Here, N denotes a natural number.

Such a selection may correspond to index information of an encryption key module to be selected, among indices identifying the encryption key modules 320, or may be predetermined by wiring in a process of designing and manufacturing the encryption key modules 320 along with the encryption module 110.

When an encryption key is provided through the process, an encryption unit 340 may execute an encryption algorithm using the encryption key to encrypt the input data, and the encrypted data may be transferred to other components via a data output unit 350 through the bus 102.

Although only the process of encrypting data has been described, a decryption process using an encryption algorithm may be similar. The embodiments of the present invention should not be construed as being limited to one of encryption and decryption.

Since the encryption key is managed within the encryption module 110 autonomously, the encryption key may not be transferred to an external environment of the encryption module 110, or to the encryption module 110 from an external environment. Accordingly, a probability of success of physical attacks may decrease. In particular, a probability of success of a physical attack of probing the bus 102 may be extremely low.

A case in which encryption keys correspond to memory devices has been described with reference to FIGS. 1 and 2. Hereinafter, embodiments in which encryption key modules are implemented using PUFs corresponding to non-memory devices will be described with reference to FIGS. 4 through 13.

For reference, a PUF mentioned herein may generate an encryption key physically unclonable and unchanged once manufactured.

Hereinafter, various embodiments in which encryption key modules are implemented by PUFs corresponding to non-memory devices will be described. FIGS. 4 through 8 may correspond to examples in which encryption key modules to generate encryption keys are implemented using a semiconductor process variation.

FIGS. 9 through 13 correspond to examples in which encryption key modules to generate encryption keys are implemented by violating a design rule for designing a circuit.

Figure 4:
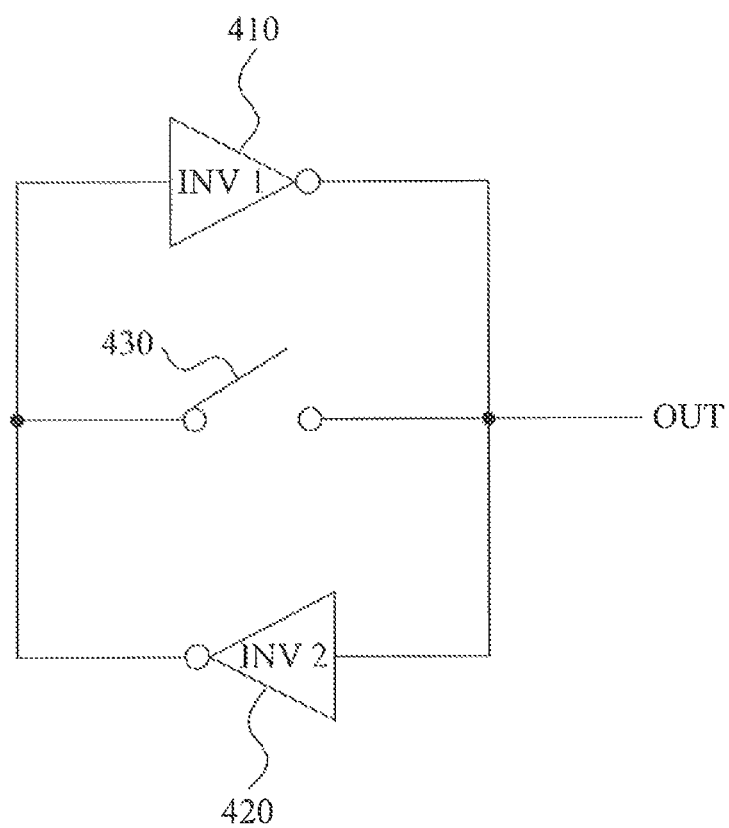
FIG. 4 is an exemplary diagram illustrating a concept of a unit cell constituting an encryption key module of a form of a physical unclonable function (PUF) to generate an encryption key using a process variation according to an embodiment of the present invention.

FIG. 4 is an exemplary diagram illustrating a concept of a unit cell constituting an encryption key module of a form of a PUF to generate an encryption key using a process variation according to an embodiment of the present invention.

In FIG. 4, a first inverter 410 and a second inverter 420 are shown.

A semiconductor process variation may be caused by various reasons. For example, when a transistor is manufactured, a process variation may be caused by a parameter, for example, a threshold voltage, an index associated with an oxide thickness, an index associated with a doping concentration, a valid gate length, or the like.

In general, a semiconductor manufacturing process with a minor process variation may be regarded as excellent. However, due to physical characteristics, the process variation may be reduced but may not be removed completely.

In the present embodiment, the first inverter 410 may have a first logic threshold, and the second inverter 420 may have a second logic threshold. A logic threshold may refer to a value of a voltage when an input voltage of an inverter is identical to an output voltage of the inverter. A further detailed description will be provided with reference to FIG. 5.

A logic threshold of an inverter device may be measured using a value of a voltage when an output terminal and an input terminal of an inverter being operated are shorted.

Inverters manufactured by an identical process may be designed to have an identical logic threshold. However, as described above, due to process variation in an actual manufacturing process, any two inverters may not have a perfectly identical logic threshold.

According to the present embodiment, the first inverter 410 and the second inverter 420 may be manufactured by an equivalent process, and may have a difference between logic thresholds resulting from a process variation.

The difference between the logic thresholds may vary depending on a process, and may correspond to, for example, a size of about a few to tens of millivolts. Accordingly, the logic threshold of the first inverter 410 and the logic threshold of the second inverter 420 measured using a separate comparator circuit may be inaccurate due to an error in measurement.

Accordingly, there is a demand for a method of comparing logic thresholds of two inverters relatively, in particular, a method of measuring logic thresholds of two inverters without a separate comparator circuit. In an embodiment of the present invention, a greater logic threshold may be determined by comparing logic thresholds of two inverters relatively (autonomously without use of a separate comparator circuit).

In a case in which the second inverter 420 is absent, an output voltage of the first inverter 410 may be identical to a logic threshold of the first inverter 410 when an input terminal and an output terminal of the first inverter 410 are shorted.

In addition, in a case in which the first inverter 410 is absent, an output voltage of the second inverter 420 may be identical to a logic threshold of the second inverter 420 when an input terminal and an output terminal of the second inverter 420 are shorted.

However, as shown in FIG. 4, when the input terminal of the first inverter 410 and the output terminal of the second inverter 420 are shorted to be connected to a first node, and the output terminal of the first inverter 410 and the input terminal of the second inverter 420 are shorted to be connected to a second node, different results may be yielded.

When the first node and the second node are shorted using a switch 430, values of voltages of the two shorted nodes may be values between the logic threshold of the first inverter 410 and the logic threshold of the second inverter 420 (may not be an average value, hereinafter, the same shall apply).

Irrespective of a greater value of the logic thresholds of the two inverters, a value of an output voltage may be a value between the logic thresholds of the two inverters while the switch 430 is closed.

When the switch 430 is opened to open the first node and the second node, a logical level of a value of a voltage of one of the first node and the second node may be "0", and a logical level of a value of a voltage of the other may be "1".

For example, when the logic threshold of the first inverter 410 is lower than the logic threshold of the second inverter 420, a voltage of the first node may be higher than the logic threshold of the first inverter 410 while the switch 430 is closed such that the first node (an opposite node of an OUT node) and the second node (the OUT node) are shorted.

Accordingly, when the switch 430 is re-opened such that the first node and the second node are opened, the first inverter 410 may recognize a voltage of the first node (corresponding to the input terminal of the first inverter 410) as a high logical level, and make a voltage of the second node corresponding to the output terminal of the first inverter 410 be a low logical level.

In this instance, the second inverter 420 may recognize a voltage of the second node (corresponding to the input terminal of the second inverter 420) as a low logical level, and make a voltage of the first node corresponding to the output terminal of the second inverter 420 be a high logical level.

Accordingly, the logical level of the voltage of the second terminal corresponding to the output terminal ("OUT") of FIG. 4 may be high.

Conversely, when the logic threshold of the first inverter 410 is higher than the logic threshold of the second inverter 420, a voltage of the first node while the switch 430 is closed such that the first node and the second node are shorted may be lower than the logic threshold of the first inverter 410.

Accordingly, when the switch 430 is re-opened such that the first node and the to second node are opened, the first inverter 410 may recognize a voltage of the first node (corresponding to the input terminal of the first inverter 410) as a low logical level, and make a voltage of the second node corresponding to the output terminal of the first inverter 410 be a high logical level.

In this instance, the second inverter 420 may recognize a voltage of the second node (corresponding to the input terminal of the second inverter 420) as a high logical level, and make a voltage of the first node corresponding to the output terminal of the second inverter 420 be a low logical level.

Accordingly, the logical level of the voltage of the second terminal corresponding to the output terminal ("OUT") of FIG. 4 may be low.

As described above, depending on a higher value of the logic threshold of the first inverter 410 and the logic threshold of the second inverter 420, the logical level of the output terminal ("OUT") after the switch 430 is shorted-opened may be high (or "1"), or low (or "0").

A greater value of logic thresholds of the first inverter 410 and the second inverter 420 manufactured by an identical manufacturing process may be determined at random. Probabilistically, a probability that one of two inverters has a logic threshold higher than a logic threshold of the other may be about 50%.

In addition, once manufactured, it may not be easy to change the greater logic threshold value.

Through the embodiment of FIG. 4, a 1-bit digital value (a value having an identical probability of being "1" or being "0", however, may not be easy to change once manufactured) may be generated.

Figure 5:
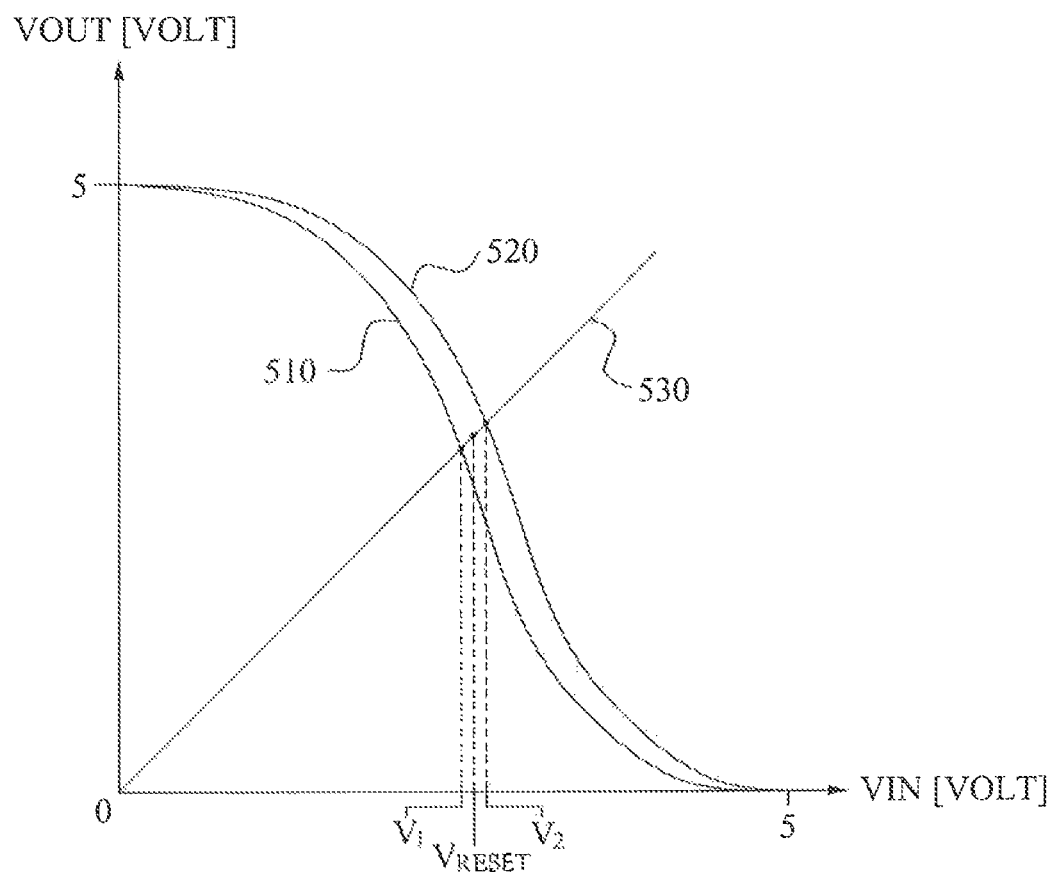
FIG. 5 is a reference graph for understanding the embodiment of FIG. 4.

The process described above may be understood more clearly through a graph of FIG. 5.

FIG. 5 is a reference graph for understanding of the embodiment of FIG. 4.

The exemplary reference graph illustrates a voltage characteristic for a case in which the logic threshold of the first inverter 410 is lower than the logic threshold of the second inverter 420 of FIG. 4.

A curve 510 indicates a voltage characteristic of the first inverter 410, and a curve 520 indicates a voltage characteristic of the second inverter 420. When the first inverter 410 and the second inverter 420 are manufactured by an equivalent manufacturing process according to an embodiment of the present invention, the curve 510 and the curve 520 may be almost identical, but may have a modest difference due to process variation.

When a point of intersection of the curve 510 and a straight line 530 with a slope of "1" is found, the logic threshold $V_1$ of the first inverter 410 may be determined. In addition, when a point of intersection of the curve 520 and the straight line 530 is found, the logic threshold $V_2$ of the second inverter 420 may be determined.

In the present embodiment, $V_1$ is lower than $V_2$. Accordingly, when the switch 430 of FIG. 4 is closed such that the first node and the second node are shorted (also referred to as "RESET"), voltages $V_{RESET}$ of the first node and the second node may correspond to values between $V_1$ and $V_2$.

When the switch 430 is re-opened such that the first node and the second node are opened, the first inverter 410 may recognize the voltage $V_{RESET}$ of the first node as a high logical level, and make the voltage of the second node corresponding to the output terminal of the first inverter 410 be a low logical level.

In this instance, the second inverter 420 may recognize the voltage $V_{RESET}$ of the second node as a low logical level, and make the voltage of the first node corresponding to the output terminal of the second inverter 420 be a high logical level.

Accordingly, the logical level of the voltage of the second terminal corresponding to the output terminal ("OUT") of FIG. 4 may be high.

In a case in which a unit cell illustrated in FIG. 4 generates a 1-bit digital value, an encryption key may be generated using an N-bit digital value by integrating N unit cells.

According to an embodiment of the present invention, the encryption key modules 320 may be implemented using such a scheme.

Figure 6:
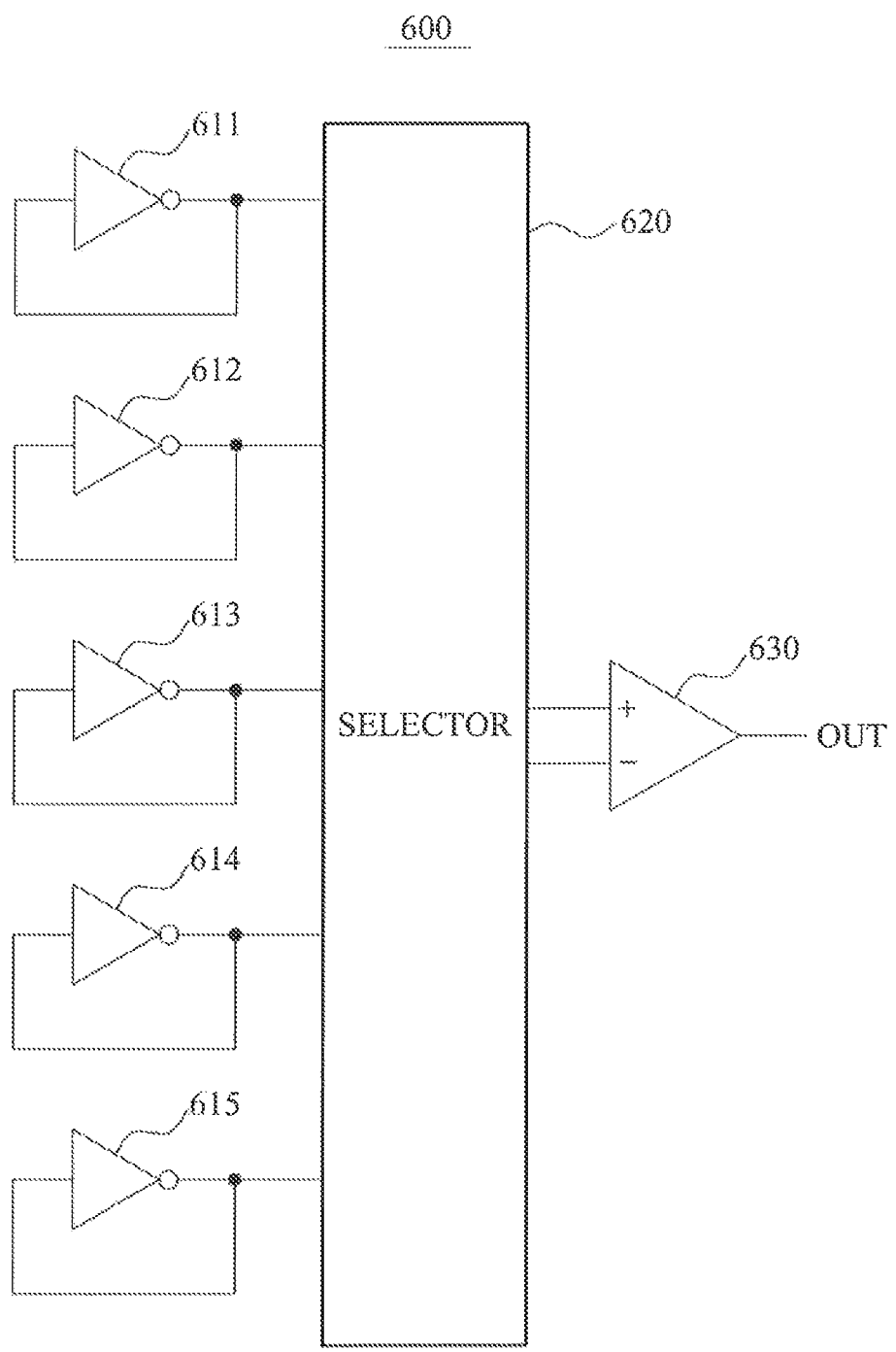
FIG. 6 is a block diagram illustrating an exemplary implementation of an encryption key module according to an embodiment of the present invention.

An encryption key module to generate an encryption key of a form of a digital value based on a difference between logic thresholds of inverter devices using a semiconductor process variation may be implemented by a configuration of FIG. 6.

FIG. 6 is a block diagram illustrating an exemplary implementation of an encryption key module 600 according to an embodiment of the present invention.

Referring to FIG. 6, the encryption key module 600 may include five inverters 611 through 615, a selector 620, and a comparator 630.

The selector 620 may select two inverters from the five inverters of FIG. 6. For example, the inverter 612 and the inverter 613 may be selected.

In this example, the comparator 630 may compare a logic threshold of the inverter 612 to a logic threshold of the inverter 613, and provide an output voltage to an OUT terminal based on a result of the comparing. A 1-bit digital value may be is generated based on a logical level of the output voltage of the OUT terminal.

When the selector 620 selects other two inverters, the comparator 630 may generate a 1-bit digital value again.

As described above, when the selector 620 selects two inverters from the five inverters 611 through 615, and the comparator 630 generates a digital value by comparing logic thresholds of the two selected inverters, a digital value of a maximum of 10 bits may be obtained.

Although five inverters are included in the present embodiment, the present invention is not limited thereto. Various changes may be made in view of an area of a circuit, a number of bits in a digital value to be generated, and the like.

In the present embodiment, considering that an area of the comparator 630 to be integrated in a semiconductor chip is considerably large, when compared to an area of the inverters 611 through 615, a plurality of inverters and the single comparator 630 are connected through the selector 620. However, in other applications, a single comparator may make a pair with two inverters to generate an N-bit digital value.

Figure 7:
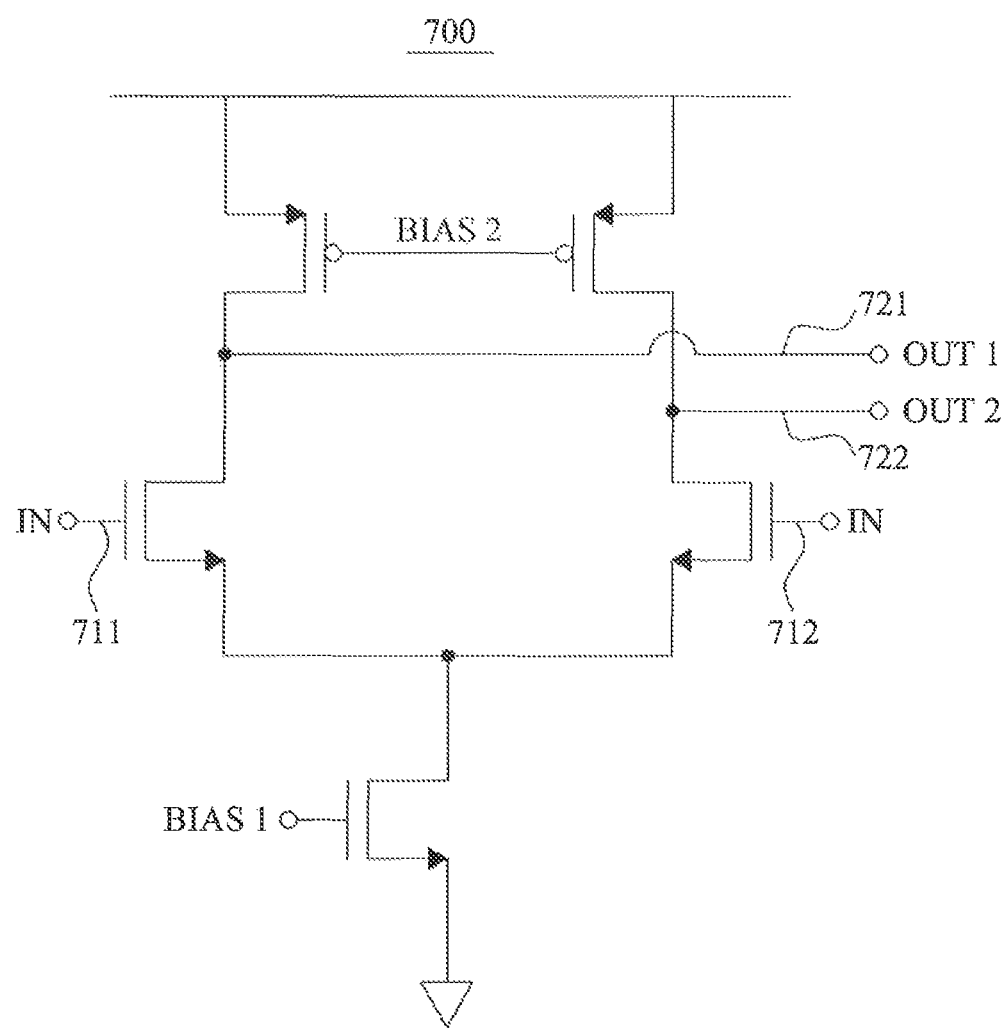
FIG. 7 illustrates a unit cell of an encryption key module to generate a digital value using a process variation of a differential amplifier according to an embodiment of the present invention.

The encryption key module to generate an encryption key of a form of a digital value based on a difference between logic thresholds of inverter devices using a semiconductor process variation may also be implemented by a configuration of FIG. 7.

FIG. 7 illustrates a unit cell 700 of an encryption key module to generate a digital value using a process variation of a differential amplifier according to an embodiment of the present invention.

The unit cell 700 may correspond to a circuit of a differential amplifier. The unit cell corresponding to the circuit of the differential amplifier including at least one device of a transistor and a resistor may amplify a difference between a voltage of a first input terminal 711 and a voltage of a second input terminal 712, and provide the amplified difference as a difference between a voltage of a first output terminal 721 and a voltage of a second output terminal 722.

Accordingly, when the first input terminal 711 and the second input terminal 712 are shorted, a value of an output voltage corresponding to the difference of the voltage of the first output terminal 721 and the voltage of the second output terminal 722 may be "0", in theory.

However, due to a difference in electrical characteristics between devices resulting from a semiconductor process variation, the voltage of the first output terminal 721 may not be identical to the voltage of the second output terminal 722.

Accordingly, by comparing voltages of two output terminals to verify a higher voltage using a method similar to the method of comparing logic thresholds of inverters in the embodiment of FIG. 6, a 1-bit digital value may be generated.

For example, in a case in which the first input terminal 711 and the second input terminal 712 are shorted, when a value of the voltage of the first output terminal 721 is higher than a value of the voltage of the second output terminal 722, a digital value "1" may be recognized. Conversely, when the value of the voltage of the first output terminal 721 is lower than the value of the voltage of the second output terminal 722, a digital value "0" may be recognized.

Accordingly, when N unit cells are integrated, each of the N unit cells may corresponding to differential amplifier 700, an encryption key may be provided in a form of an N-bit digital value, and an encryption key module according to an embodiment of the present invention may be implemented. Such an implementation is illustrated in FIG. 8.

Figure 8:
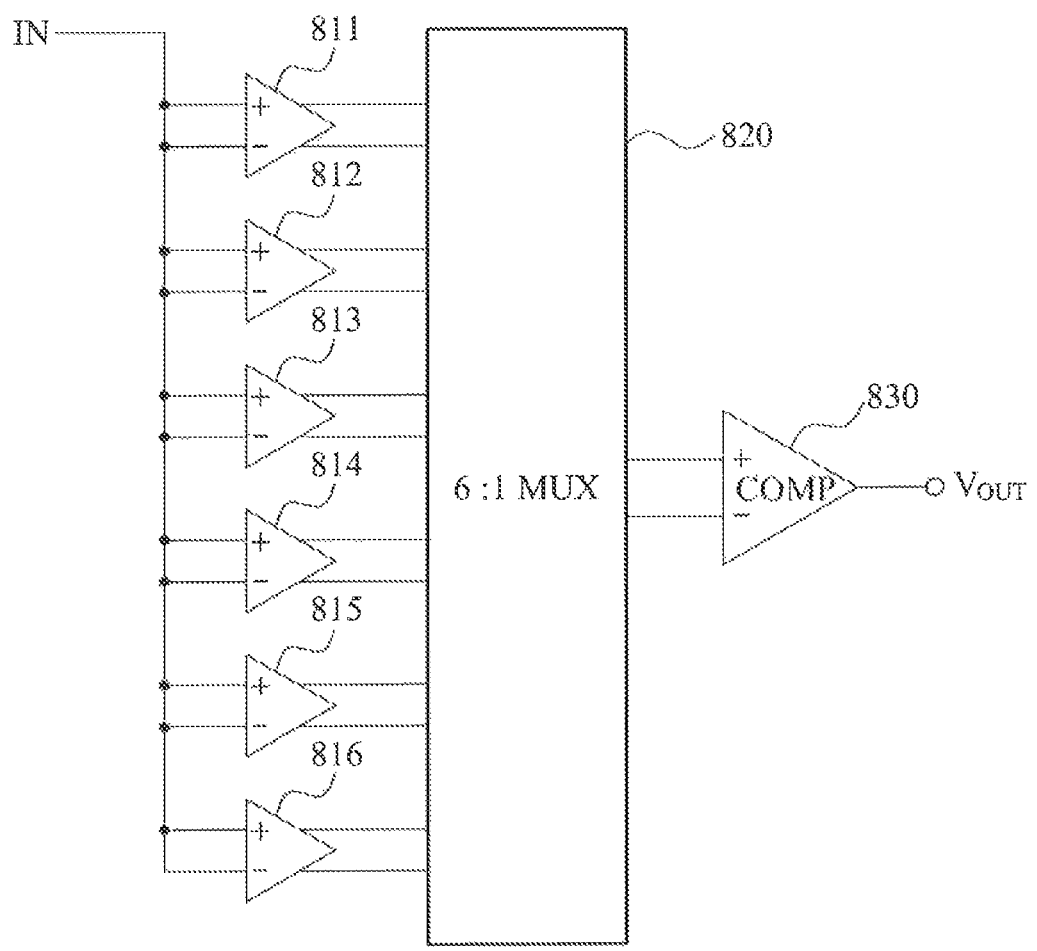
FIG. 8 illustrates an exemplary diagram in which an encryption key module is implemented according to an embodiment of the present invention.

FIG. 8 illustrates an exemplary diagram in which an encryption key module 800 is implemented according to an embodiment of the present invention.

Referring to FIG. 8, the encryption key module 800 may include six differential amplifiers 811 through 816, a selector 820 to select one from the six differential amplifiers, and a comparator 830 to compare two output voltages of the differential amplifier selected by the selector 820 to generate a 1-bit digital value.

In this example, all input terminals of the six differential amplifiers 811 through 816 may be shorted, and may have an identical voltage.

According to an embodiment of the present invention, the selector 820 may include a 6:1 multiplexer (MUX) device. However, the present embodiment may be an example for implementation of the present invention, and the present invention is not limited to a specific embodiment.

Accordingly, a number of input/output ports of the MUX device may be changed. In addition, the selector 820 may include another device, other than the MUX device. The 6:1 MUX device may output, to two output terminals, output voltages of the six differential amplifiers through twelve input terminals. The two is output terminals may be connected to two input terminals of the comparator 830.

In the present embodiment, the encryption key module 800 may generate an encryption key corresponding to a 6-bit digital value.

The embodiments in which encryption key modules are implemented using a semiconductor process variation have been described with reference to FIGS. 4 through 8.

Hereinafter, embodiments in which encryption key modules are implemented by violating a semiconductor design rule will be described with reference to FIGS. 9 through 13.

Figure 9:
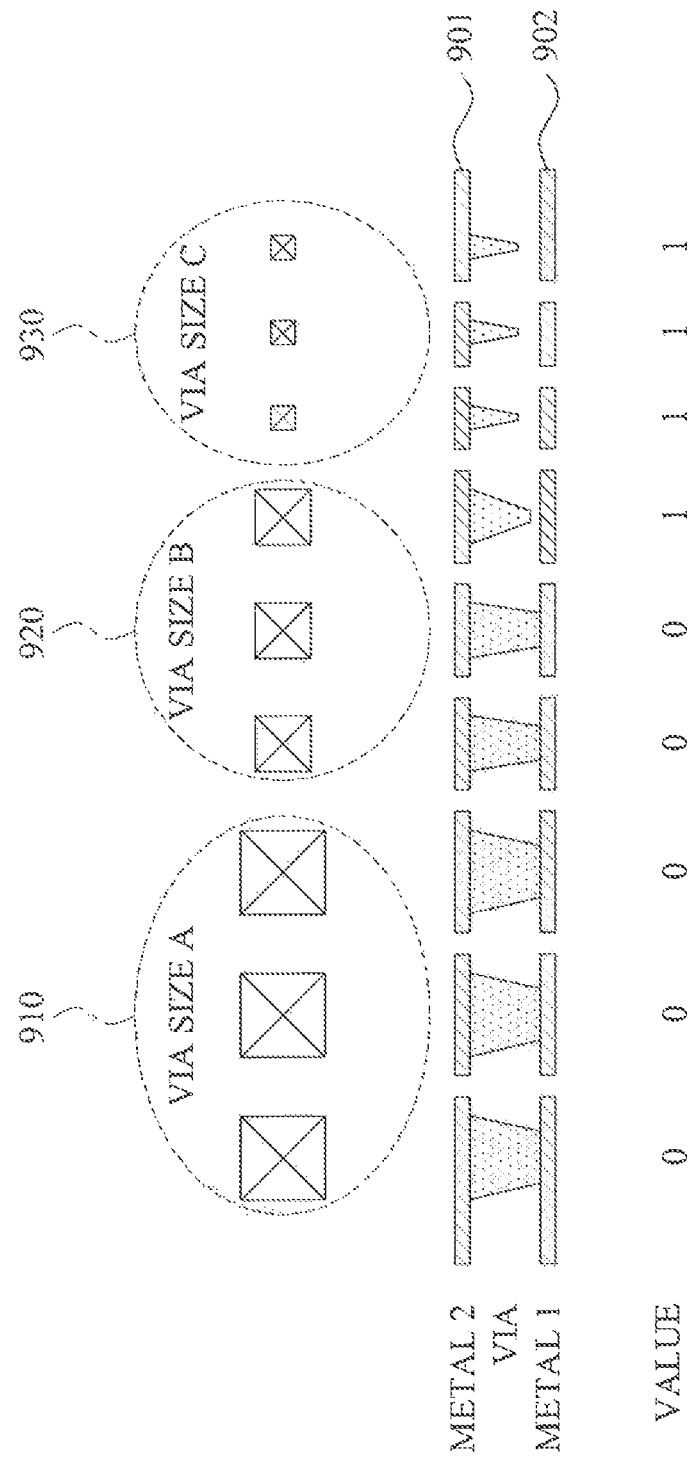
FIG. 9 is a conceptual diagram illustrating a principle of generating an encryption key module by violating a semiconductor design rule according to an embodiment of the present invention.

FIG. 9 is a conceptual diagram illustrating a principle of generating an encryption key module by violating a semiconductor design rule according to an embodiment of the present invention.

In general, a contact or a via may be designed to connect conductive layers, and a size of the contact or the via may be determined for the conductive layers to be shorted, in a general design rule, a minimum size of a contact or a via may be determined to guarantee that conductive layers are shorted.

However, in an implementation of encryption key modules according to an embodiment of the present invention, by reducing a size of a contact or a via to be smaller than a size determined in the design rule, a portion of contacts or vias may short conductive layers, and another portion of the contacts or the vias may not short the conductive layers. Whether the contacts or the vias short the conductive layers may be determined, probabilistically.

In a conventional semiconductor process, when a contact or a via is not able to short conductive layers, the process may be considered to have failed. However, in the present invention, such a failure may be used to generate an encryption key having randomness.

Referring to FIG. 9, vias may be formed between a first metal layer 902 and a second metal layer 901 in a semiconductor manufacturing process.

In a group 910 in which vias are set to a sufficient size according to a design rule, all of the vias may short the first metal layer 902 and the second metal layer 901, and whether the vias short the first metal layer 902 and the second metal layer 901 may be expressed by a digital value "0".

In a group 930 in which vias are set to a small size, all of the vias may not short the first metal layer 902 and the second metal layer 901. Accordingly, whether the vias short the first metal layer 902 and the second metal layer 901 may be expressed by a digital value "1".

In a group 920 in which sizes of vias are between the sizes of the vias of the group 910 and the sizes of the vias of the group 930, a portion of the vias may short the first metal layer 902 and the second metal layer 901, and another portion of the vias may not short the first metal layer 902 and the second metal layer 901.

According to an embodiment of the present invention, in order to implement an encryption key module, sizes of vias may be set for a portion of the vias to short the first metal layer 902 and the second metal layer 901, and another portion of the vias not to short the first metal layer 902 and the second metal layer 901, as shown in the group 920.

A design rule associated with a size of a via may vary depending on a semiconductor manufacturing process. For example, when a size of a via complying a design rule is set to 0.25 micrometers (μm) in a process of manufacturing a complementary metal-oxide-semiconductor (CMOS) of 0.18 μm, in an implementation of an encryption key module according to an embodiment of the present invention, the design rule may be violated to set the size of the via to 0.19 μm, whereby whether the via short metal layers may be distributed probabilistically.

The probability distribution regarding whether the via shorts the metal layers may be set to a short probability of 50%, ideally. In the implementation of encryption key modules according to an embodiment of the present invention, the size of the via may be set for the probability distribution to be as close as possible to 50%. In the setting of the size of the via, the size of the via may be determined by an experiment according to a process.

Figure 10:
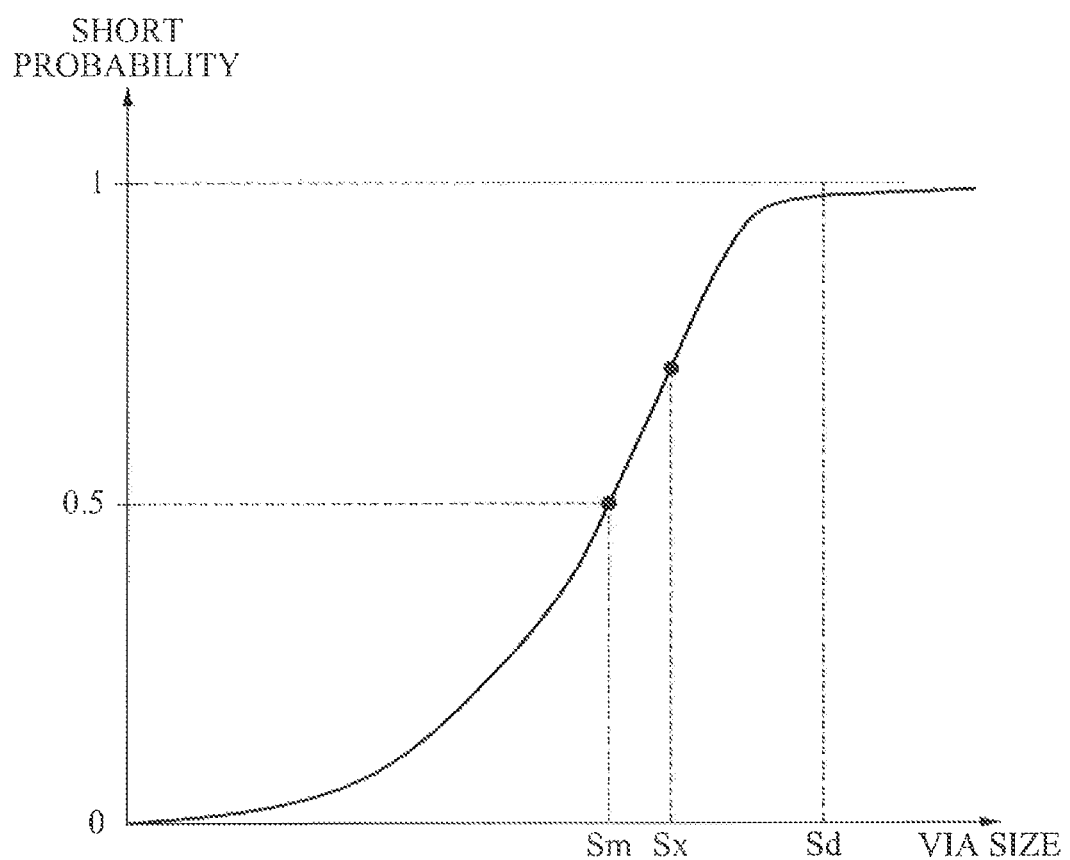
FIG. 10 is a graph illustrating a configuration of an encryption key module implemented by violating a semiconductor design rule according to an embodiment of the present invention.

FIG. 10 is a graph illustrating a configuration of an encryption key module to implemented by violating a semiconductor design rule according to an embodiment of the present invention.

In the graph, as a size of a via increases, a probability that metal layers are shorted may become closer to "1". Sd denotes a size of a via according to a design rule, and may correspond to a value sufficiently guaranteeing that the metal layers are shorted.

Sm denotes a size of a via with which a probability that the metal layers are shorted may correspond to "0.5", in theory. As described above, the value may be changed depending on a process, and a similar value may be found by an experiment. However, an exact value of Sm may not be easy to find.

Accordingly, in an implementation of encryption key modules according to an embodiment of the present invention, whether the metal layers are shorted may be set to 0.5 within a range between Sx1 and Sx2 (although not shown separately, denoting a region having a predetermined margin based on Sx) that may have a predetermined allowable error found by experimentation.

The embodiments in which an encryption key module is implemented by violating a design rule associated with a size of a via have been described with reference to FIGS. 9 and 10. According to other embodiments of the present invention, encryption key modules may be implemented by violating a design rule associated with a gap between conductive layers.

Figure 11:
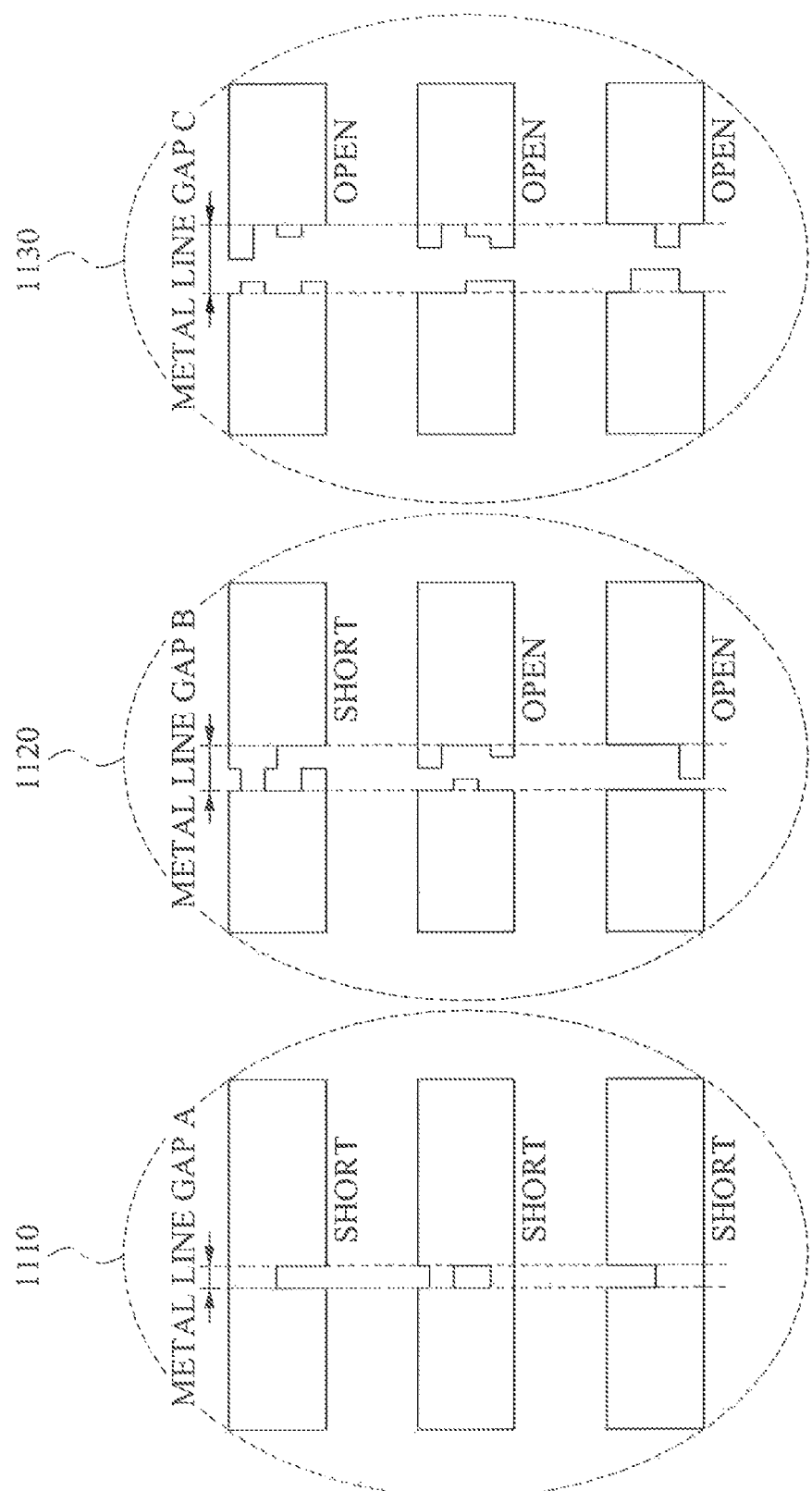
FIG. 11 is a conceptual diagram illustrating a process of generating an encryption key module by adjusting a gap between conductive layers according to an embodiment of the present invention.

FIG. 11 is a conceptual diagram illustrating a process of generating an encryption key module by adjusting a gap between conductive layers according to an embodiment of the present invention.

As described above, according to the present embodiment, by adjusting a gap between metal lines, whether the metal lines are shorted may be determined probabilistically.

In a group 1110 in which gaps between metal lines are sufficiently narrow to guarantee that the metal lines are shorted, all of the metal lines are shorted.

In a group 1130 in which gaps between metal lines are large, all of the metal lines are not shorted.

In the present embodiment, in order to implement an encryption key module, gaps between metal lines may be set to short the metal lines probabilistically, for a portion of the metal lines to be shorted and another portion of the metal lines not to be shorted, as shown in a group 1120.

Figure 12:
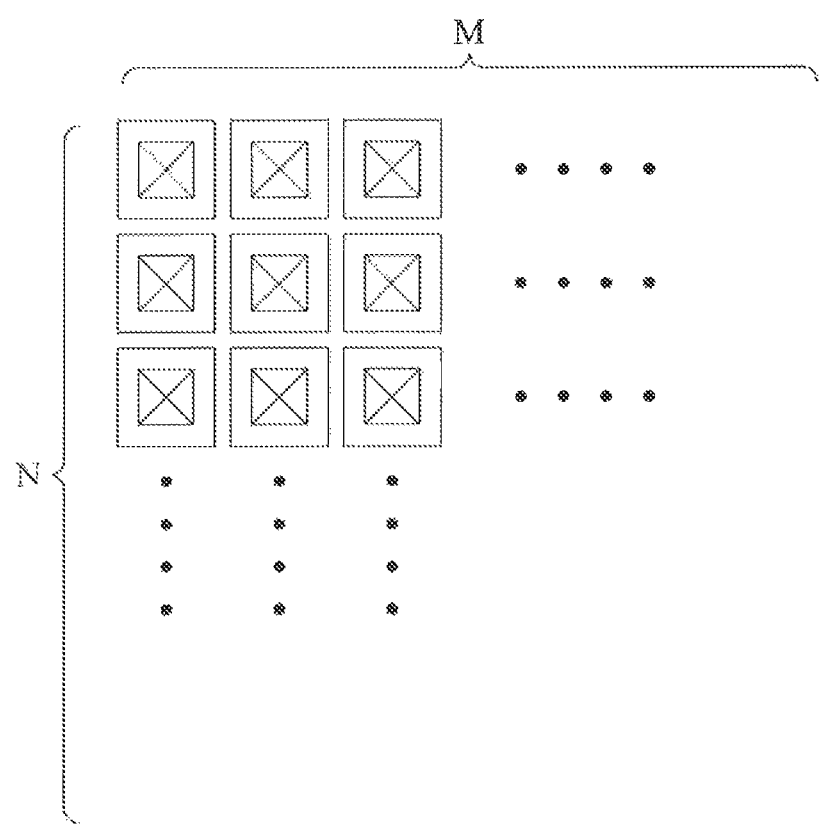
FIG. 12 is a conceptual diagram illustrating an exemplary structure of an array of vias or contacts formed on a semiconductor layer to implement an encryption key module according to an embodiment of the present invention.

FIG. 12 is a conceptual diagram illustrating an exemplary structure of an array of vias or contacts formed on a semiconductor layer to implement an encryption key module 1200 according to an embodiment of the present invention.

Referring to FIG. 12, M vias in width and N vias in length, a total of M×N vias, may be formed between metal layers laminated on a semiconductor substrate. Here, M and N denote natural numbers.

The encryption key module 1200 may generate and provide an encryption key of M×N bits, based on whether each of the M×N vias shorts the metal layers (a digital value "0"), or does not short the metal layers (a digital value "1").

Figure 13:
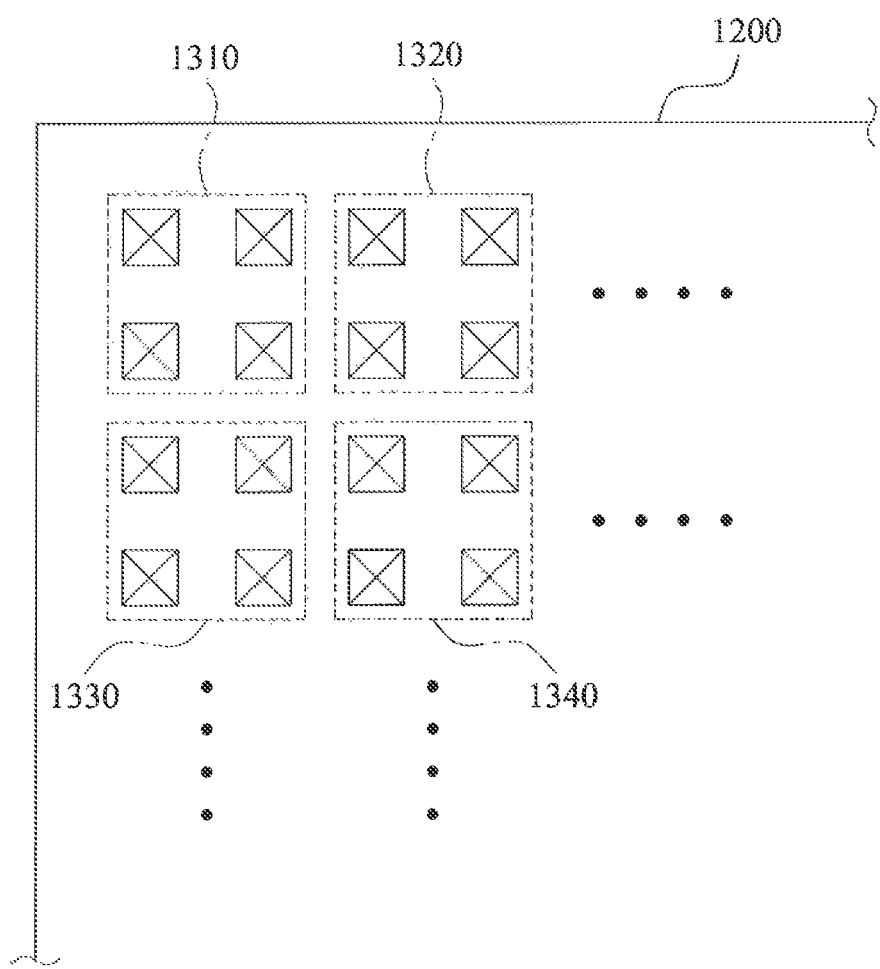
FIG. 13 is a conceptual diagram illustrating a process of post-processing a digital value generated in the embodiment of FIG. 12 for balancing of "0" and "1", rather than using the original digital value as an encryption key, according to an embodiment of the present invention.

FIG. 13 is a conceptual diagram illustrating a process of post-processing a digital value generated in the embodiment of FIG. 12 for balancing of "0" and "1", rather than using the original digital value as an encryption key, according to an embodiment of the present invention.

According to the present embodiment, an M×N-bit digital value generated by the encryption key module 1200 may be divided based on k predetermined units. Here, k denotes a natural number.

The division shown in FIG. 13 may be provided as an example for ease of description. In an actual implementation, a method of dividing flip-flops or registers in the encryption key module 1200, and the like may be possible.

Accordingly, various changes and applications may be made by those skilled in the art to the process of performing balancing of "0" and "1" using the method of dividing the digital value, and such changes and applications should not be construed as departing from the scope of the present invention.

In the example of FIG. 13, four digital values may be classified as a single group.

The encryption key module 1200 may compare a size of a 4-bit digital value generated by a group 1310 to a size of a 4-bit digital value generated by a group 1320. When the 4-bit digital value of the group 1310 is greater than the 4-bit digital value of the group 1320, digital values representing the group 1310 and the group 1320 may be determined to be "1".

Conversely, when the 4-bit digital value of the group 1310 is less than the 4-bit digital value of the group 1320, the digital values representing the group 1310 and the group 1320 may be determined to be "0".

In another embodiment, digital values representing groups may be determined by comparing numbers of 1-bit digital values of the groups.

The method according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An integrated circuit for executing an encryption algorithm using an encryption key by receiving an input data to be encrypted, the integrated circuit comprising:
   a plurality of encryption key modules;
   an encryption key module selector to select one of the plurality of encryption key modules;
   a processor to execute the encryption algorithm using an encryption key provided by the selected encryption key module; and
   a plurality of standard cells, wherein the plurality of encryption key modules are disposed at random positions among layouts of the plurality of standard cells.

2. The integrated circuit of claim 1, wherein the encryption key module selector selects an encryption key module corresponding to a pre-assigned identification index from among the plurality of encryption key modules.

3. The integrated circuit of claim 1, wherein:
   the encryption key provided by the selected encryption key module does not leak out of the integrated circuit, and an additional encryption key for executing the encryption algorithm does not flow in the integrated circuit.

4. The integrated circuit of claim 1, wherein the encryption key module comprises a non-volatile memory to store a pre-generated encryption key.

5. The integrated circuit of claim 1, wherein the encryption key module comprises a non-memory module to generate and provide the encryption key.

6. The integrated circuit of claim 1, wherein the integrated circuit is disposed in a smart card to execute the encryption algorithm in applications of the smart card.

7. An encryption device for executing an encryption algorithm using an encryption key by receiving an input data to be encrypted, the encryption device comprising:
   an encryption module, comprising an encryption key module to provide an encryption key, to execute the encryption algorithm using the encryption key, the encryption key module comprising nodes,
   wherein the nodes comprise conductive layers of a semiconductor, and
   wherein whether the nodes are shorted is probabilistically determined by violating a design rule provided in a semiconductor manufacturing process, and the encryption key module generates and provides the encryption key based on a result of reading whether the nodes are shorted.

8. The encryption device of claim 7, wherein the design rule is associated with a size of a via or a contact formed between the conductive layers of the semiconductor, and the encryption key module generates and provides the encryption key based on whether the via or the contact shorts the conductive layers.

9. The encryption device of claim 8, wherein the via or the contact has a size by which a difference between a probability that the via or the contact shorts the conductive layers and a probability that the via or the contact does not short the conductive layers is within a predetermined error range by violating the design rule.

10. The encryption device of claim 7, wherein the encryption key module comprises N unit structures, each one of which generates a 1-bit digital value using a single pair of conductive layers and a single via or a contact connecting the conductive layers, and generates an N-bit digital value generated through the N unit structures as the encryption key,
   wherein N denotes a natural number.

11. The encryption device of claim 10, wherein the encryption key module generates an N/k-bit digital value as the encryption key, by dividing the generated N-bit digital value into k units, comparing a first group to a second group, among the plurality of groups, determining digital values representing the first group and the second group to be "1" when a value comprising k digital bits included in the first group is greater than a value comprising k digital bits included in the second group, and determining the digital values representing the first group and the second group to be "0" when the value comprising k digital bits included in the first group is less than or equal to the value comprising k digital bits included in the second group,
   wherein k denotes a natural number.

12. The encryption device of claim 7, wherein:
   the design rule is associated with a gap between the conductive layers of the semiconductor, and the encryption key module generates and provides the encryption key based on whether the conductive layers of the semiconductor are shorted.

13. An encryption device for executing an encryption algorithm using an encryption key by receiving an input data to be encrypted, the encryption device comprising:
   an encryption module, comprising an encryption key module to provide an encryption key, to execute the encryption algorithm using the encryption key,
   wherein:
   the encryption key module comprises N unit cells, each to output a 1-bit digital value, each of the N unit cells generates the 1-bit digital value based on a semiconductor manufacturing process variation, and
   the encryption key module generates and provides an encryption key of N bits,
   wherein N denotes a natural number.

14. The encryption device of claim 13, wherein a first unit cell among the N unit cells comprises:
   a first inverter having a first logic threshold; and
   a second inverter having a second logic threshold,
   wherein the first inverter and the second inverter form a feedback structure in which an input terminal of the first inverter and an output terminal of the second inverter are connected to a first node, and an output terminal of the first inverter and an input terminal of the second inverter are connected to a second node, and
   the first logic threshold is different from the second logic threshold based on the semiconductor manufacturing process variation, and a 1-bit digital value corresponding to the first unit cell is determined based on a logical level of the first node and a logical level of the second node.

15. An encryption device for executing an encryption algorithm using an encryption key by receiving an input data to be encrypted, the encryption device comprising:
   an encryption module, comprising an encryption key module to provide an encryption key, to execute the encryption algorithm using the encryption key,
   wherein the encryption key module comprises N differential amplifiers,
   wherein, when two input terminals of a first differential amplifier, among the N differential amplifiers, are shorted, logical levels of two output terminals of the first differential amplifier differ from each other based on the semiconductor manufacturing process variation, and a 1-bit digital value corresponding to the first differential amplifier is determined based on the logical levels of the two output terminals, and
   the encryption key module generates and provides an encryption key of N bits,
   wherein N denotes a natural number.

16. An encryption method comprising:
   receiving by an encryption module, an input data to be encrypted, wherein the encryption module comprises a plurality of encryption key modules and a plurality of standard cells;
   selecting one of the plurality of encryption key modules; and
   encrypting the data by executing an encryption algorithm using the encryption key provided by the selected encryption key module,
   wherein the plurality of encryption key modules are disposed at random positions among layouts of the plurality of standard cells.

* * * * *